US008630682B2

(12) United States Patent
Garcia (10) Patent No.: US 8,630,682 B2
(45) Date of Patent: Jan. 14, 2014

(54) METHOD AND APPARATUS FOR TIME-BASED MEDIATION OF WIRELESS COMMUNICATIONS

(75) Inventor: Juan Martin Garcia, Mississauga (CA)

(73) Assignee: BlackBerry Limited, Waterloo, Ontario (CA)

(*) Notice: Subject to any disclaimer, the term of this patent is extended or adjusted under 35 U.S.C. 154(b) by 618 days.

(21) Appl. No.: 12/820,016

(22) Filed: Jun. 21, 2010

(65) Prior Publication Data
US 2011/0312315 A1    Dec. 22, 2011

(51) Int. Cl.
H04W 4/00    (2009.01)
H04M 3/42    (2006.01)

(52) U.S. Cl.
USPC ............ 455/557; 455/422.1; 455/412.1; 455/414.1; 455/418; 455/426.1; 455/575.1; 455/560; 455/566

(58) Field of Classification Search
USPC ............ 455/422.1, 412.1, 414.1, 418, 426.1, 455/575.1, 560, 566, 557
See application file for complete search history.

(56) References Cited

U.S. PATENT DOCUMENTS

| | | | | |
|---|---|---|---|---|
| 6,330,454 | B1 * | 12/2001 | Verdonk ................... | 455/456.2 |
| 6,745,023 | B1 * | 6/2004 | Offer ........................ | 455/410 |
| 7,330,720 | B2 * | 2/2008 | Hinz ......................... | 455/422.1 |
| 7,890,576 | B2 * | 2/2011 | Button et al. ............. | 709/203 |
| 8,150,012 | B2 * | 4/2012 | Shah ........................ | 379/142.11 |
| 8,161,174 | B1 * | 4/2012 | Sankaranaraynan et al. | 709/229 |
| 8,260,317 | B2 * | 9/2012 | Laflamme et al. ........ | 455/456.1 |
| 8,301,169 | B2 * | 10/2012 | Hung et al. ............... | 455/456.3 |
| 8,416,804 | B2 * | 4/2013 | Tischer et al. ............ | 370/466 |
| 2003/0040313 | A1 * | 2/2003 | Hogan et al. .............. | 455/435 |
| 2005/0114768 | A1 * | 5/2005 | Atkin et al. ............... | 715/530 |
| 2005/0249023 | A1 * | 11/2005 | Bodlaender ............... | 365/232 |
| 2007/0088818 | A1 * | 4/2007 | Roberts et al. ............ | 709/224 |
| 2007/0088839 | A1 * | 4/2007 | Yoakum ..................... | 709/228 |
| 2007/0160024 | A1 * | 7/2007 | Jung et al. ................. | 370/338 |
| 2007/0177619 | A1 * | 8/2007 | Jung et al. ................. | 370/410 |

(Continued)

FOREIGN PATENT DOCUMENTS

| EP | 1 551 158 A2 | 7/2005 |
|---|---|---|
| EP | 1 936 552 A1 | 7/2005 |
| WO | 02/23935 A2 | 3/2002 |

OTHER PUBLICATIONS

Copending Application entitled "System and Method for Providing Time Zone as Instant Messaging Presence", Hung et al., U.S. Appl. No. 12/713,923, filed Feb. 26, 2010 (not yet published).

(Continued)

*Primary Examiner* — Bobbak Safaipour
(74) *Attorney, Agent, or Firm* — MBM Intellectual Property Law, LLP (57) ABSTRACT

A method and apparatus for time-based mediation of wireless communications is provided to a user of a wireless communications device. The method involves determining local time information associated with the recipient communication device in response to a user-initiated contact function; determining a mediation condition based at least in part on said local time information; and if the mediation condition satisfies a predetermined criterion: providing, to a user of the wireless communication device, an indication of said mediation condition; presenting, to said user, a menu of two or more options for contacting the recipient communication device using the wireless communication device; and initiating communication in accordance with an option selected from said menu. The method can be implemented on an apparatus such as a wireless communication device.

26 Claims, 6 Drawing Sheets

(56) References Cited

U.S. PATENT DOCUMENTS

| | | | |
|---|---|---|---|
| 2008/0153474 A1* | 6/2008 | Scott | 455/418 |
| 2009/0124271 A1* | 5/2009 | Roundtree et al. | 455/466 |
| 2011/0010430 A1* | 1/2011 | Wang et al. | 709/217 |
| 2011/0029598 A1* | 2/2011 | Arnold et al. | 709/203 |
| 2011/0099270 A1* | 4/2011 | Hartman et al. | 709/224 |

OTHER PUBLICATIONS

"Sender Time Zone," Gmail Labs Log Blog, Apr. 8, 2009, http://gmailblog.blogspot.com/2009/04/new-in-labs-sender-time-zone.html.

"Cell Phone Time Zone Locator," Aug. 21, 2006, http://www.halfbakery.com/idea/Cell__20Phone__20Time__20Zone__20Locator#1156197054.

* cited by examiner

METHOD AND APPARATUS FOR TIME-BASED MEDIATION OF WIRELESS COMMUNICATIONS

CROSS-REFERENCE TO RELATED APPLICATIONS

This is the first application filed for the present technology.

TECHNICAL FIELD

The present disclosure relates generally to mobile electronic devices and, in particular, to a method and apparatus for time-based mediation of wireless communications.

BACKGROUND

Mobile wireless communication devices such as cellular telephones, handheld PDAs, and the like, allow users to communicate using voice, text messaging, email, instant messaging, or the like. Furthermore, mobile devices may be capable of operation in many regions around the world, allowing users to travel and stay in contact using a single mobile device.

Telephone etiquette and limitations on availability of a recipient to receive or respond to a sender's message or request for communication may complicate communication attempts, or even undesirably disturb a potential call recipient if a call is placed at an inappropriate time. This problem is further complicated when the sender and recipient are in different time zones, particularly when the sender is not aware of the recipient's time zone.

Therefore there is a need for a method and apparatus for time-based mediation of wireless communications that is not subject to one or more limitations of the prior art.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

The present technology generally provides a method, wireless communication device and computer program product for time-based mediation of wireless communications.

Accordingly, an aspect of the present technology is a method for facilitating communication between a wireless communication device and a recipient communication device. The method comprises determining local time information associated with the recipient communication device in response to a user-initiated contact function. The user-initiated contact function may be generated in response to an action, performed on a user interface module of the wireless communication device, for initiating a voice call by dialing a number, selecting an option from an address book to dial, text, email, or otherwise contact a recipient, pressing a speed-dial key, or the like. The local time information may be indicative of a time zone difference between the wireless communication device and the recipient communication device, a current local time of the recipient communication device, or a combination thereof.

The method further comprises determining a mediation condition based at least in part on said local time information. The mediation condition may be, for example, indicative of whether said local time information is within an appropriate range for contacting the recipient communication device using one or more communication modes. The mediation condition may be further indicative of one or more ranges of appropriate times for contacting the recipient communication device, each of said one or more ranges associated with a different set of one or more communication modes.

The method further comprises determining if the mediation condition satisfies a predetermined criterion, and if so, providing, to a user of the wireless communication device, an indication of said mediation condition; presenting, to said user, a menu of two or more options for contacting the recipient communication device using the wireless communication device; and initiating communication in accordance with an option selected from said menu. For example, in some embodiments, the options may include an option for contacting the recipient communication device using a voice-based communication mode and an option for contacting the recipient communication device using a data-based communication mode. In some embodiments, the options may include an option for scheduling contact with the recipient communication device at a future time. Communication may be performed via a wireless communication module of the wireless communication device, via an existing communication network.

In some embodiments, the method further comprises initiating an automatic communication session between the wireless communication device and the recipient communication device, and determining at least one of said local time information and said mediation condition based at least in part on data exchanged during the automatic communication session. The automatic communication session may be a machine-to-machine session which takes place prior to user-to-user communication. The automatic communication session may occur along with other call set-up procedures, for example.

Another aspect of the present technology is a computer program product comprising code adapted to perform acts associated with the foregoing method when the code is loaded into memory and executed on a processor of a wireless communications device.

Yet another aspect of the present technology is a wireless communication device comprising a user interface module and a mediation module. The wireless communication device can further include a wireless communication module in operative association with the user interface and the mediation module.

The user interface module of the wireless communication device is configured to initiate a contact function in response to user input, the contact function for initiating contact with an indicated recipient communication device. The contact function may be a signal indicative of a user operation to select a recipient device corresponding to a contact from an address book, a dialed telephone number, an input email address, a speed-dial button, or the like. The user interface module may be associated with components of the wireless communication device, such as an input user interface, a processor, and memory locations containing instructions for performing operations of the user interface module.

The mediation module of the wireless communication device is configured to: determine, in response to the contact function, local time information associated with the recipient communication device; determine a mediation condition based in part on said local time information; and if the mediation condition satisfies a predetermined criterion, provide, via the user interface module, an indication of said mediation condition; present, via the user interface module, a menu of two or more options for contacting the recipient communication device; and initiate communication in accordance with an option selected from said menu. The mediation module may be further configured to operate substantially in accordance with one or more methods as described herein. The mediation module may be associated with components of the wireless communication device, such as a processor and memory locations containing instructions for performing operations of the mediation module.

The wireless communication module of the wireless communication device is configured to perform communication in accordance with the selected option. The wireless communication module is further configured to support at least one voice-based communication mode and at least one data-based communication mode. The wireless communication module may be associated with at least a wireless transceiver of the wireless communication device, and components associated therewith.

The details and particulars of these aspects of the technology will now be described below, by way of example, with reference to the attached drawings.

Figure 1:
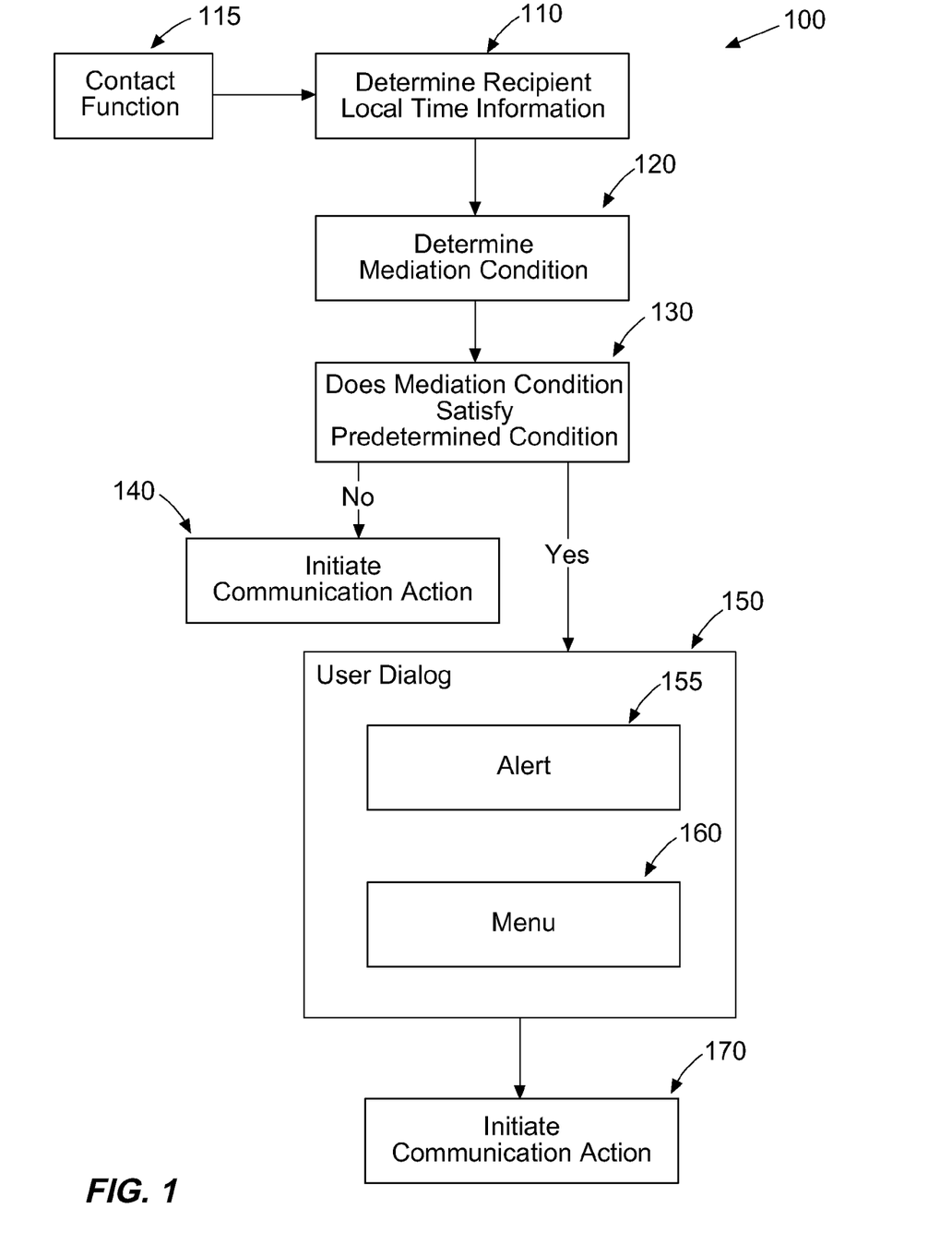
FIG. 1 illustrates a method for facilitating communication between a wireless communication device and a recipient communication device, in accordance with embodiments of the present invention.

FIG. 1 illustrates a method 100 for facilitating communication between a wireless communication device and a recipient communication device. The method 100 comprises determining local time information 110 associated with the recipient communication device in response to a user-initiated contact function 115. The method 100 further comprises determining a mediation condition 120 based at least in part on said local time information 110. The method 100 further comprises determining 130 if the mediation condition satisfies a predetermined condition, and, if so, initiating and responding to a user dialog 150, otherwise, initiating a communication action 140 specified by the user-initiated contact function 115. The user dialog 150 comprises providing an indication 155 of the mediation condition to a user of the wireless communication device, for example as an alert via a user interface of the wireless communication device. The user dialog 150 further comprises presenting to the user a menu 160 of two or more options for contacting the recipient communication device. The method 100 further comprises, in response to the user dialog 150, initiating a communication action 170 in accordance with an option selected from the menu 160.

Embodiments of the present invention may facilitate an improved user-to-user communication experience, by mediating modes of communication between communication device users, timing of communication between such users, or a combination thereof. For example, in some embodiments, when a user attempts to initiate a voice call to a recipient via a wireless communication device operating in accordance with the present invention, a current local time of the recipient is automatically determined, as are a set of preferences regarding appropriate times for contacting the recipient via voice and possibly via one or more other communication modes, such as text messaging or email. The current local time and set of preferences may be determined by direct communication with the recipient communication device, or by another method.

The set of preferences may include preferences of one or both users, and may depend on other information such as the identities of the parties involved. From this information, a mediation condition is determined, which indicates whether the recipient's current local time is appropriate for accepting a voice call. The mediation condition may optionally include other information such as whether the recipient's current local time is appropriate for some other mode of communication, a schedule or range of appropriate times for contacting the recipient using one or more communication modes, or a combination thereof, or the like. If the time is appropriate, the call can proceed. Otherwise, the initiating user is alerted that the call is currently inappropriate, and given a choice of whether to proceed, selects an alternative communication mode, or schedule a communication at a future time.

Embodiments of the present invention may enhance user experience by providing a sufficient choice of options for appropriately contacting a recipient. For example, if the current local time of the recipient is within a "do not disturb" range, for example indicative of the recipient being busy or asleep, then the present invention facilitates a choice to send an email to the recipient instead, which is less likely to disturb the recipient, or to schedule a reminder to call back the recipient at a future time.

In accordance with an embodiment of the present invention, there is provided a wireless communication device comprising: a user interface module configured to initiate a contact function in response to user input; a wireless communication module operatively coupled to the user interface module, the wireless communication module configured to initiate contact with a recipient communication device in response to the contact function; a mediation module operatively coupled to the user interface module and the wireless communication module, the mediation module configured to: initiate an automatic communication session with the contacted recipient communication device; determine a mediation condition based at least in part on data exchanged during the automatic communication session, the mediation condition further based in part on information regarding local time of the recipient communication device; and if the mediation condition satisfies a predetermined criterion, provide, via the user interface module, an indication of said mediation condition; present, via the user interface module, a menu of two or more options for communication with the recipient communication device; and initiate a communication action in accordance with an option selected from said menu.

According to another embodiment of the present invention, there is provided a method for facilitating communication between a wireless communication device and a recipient communication device, the method comprising: initiating an automatic communication session between the wireless communication device and the recipient communication device in response to a user-initiated contact function; determining a mediation condition based at least in part on data exchanged during the automatic communication session, the mediation condition further based in part on information regarding local time of the recipient communication device; and if the mediation condition satisfies a predetermined criterion: providing, to a user of the wireless communication device, an indication of said mediation condition; presenting, to said user, a menu of two or more options for communication between the wireless communication device and the recipient communication device; and initiating a communication action in accordance with an option selected from said menu.

Figure 2:
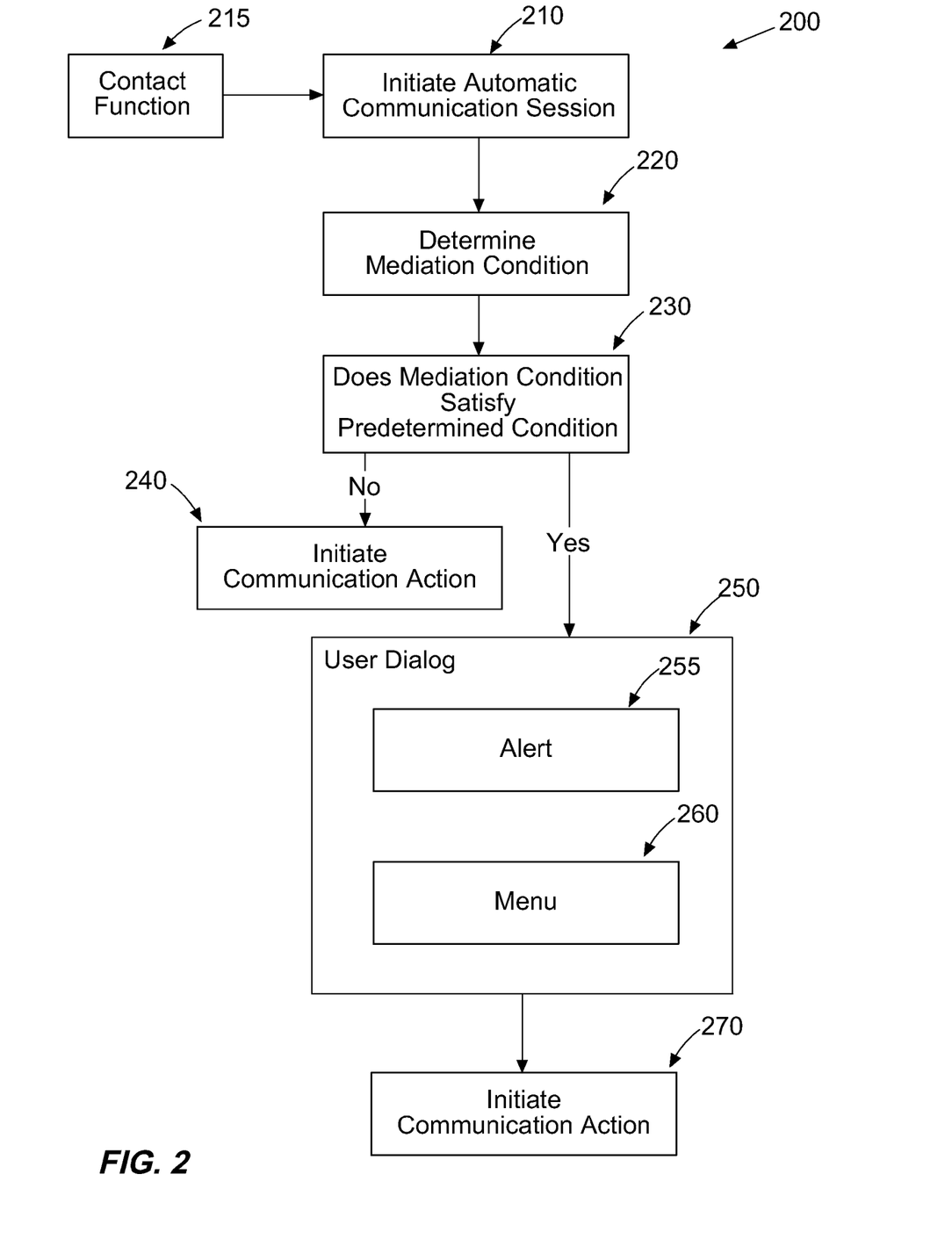
FIG. 2 illustrates a method for facilitating communication between a wireless communication device and a recipient communication device, in accordance with embodiments of the present invention.

FIG. 2 illustrates a method 200 for facilitating communication between a wireless communication device and a recipient communication device. The method 200 comprises initiating an automatic communication session 210 between the wireless communication device and the recipient communication device in response to a user-initiated contact function 215. The method 200 further comprises determining 220 a mediation condition based at least in part on data exchanged during the automatic communication session. The mediation condition is based in part on information regarding local time of the recipient communication device, such as a time zone or local time thereof, or both. The method 200 further comprises determining 230 if the mediation condition satisfies a predetermined condition, and, if so, initiating and responding to a user dialog 250, otherwise, initiating a communication action 240 specified by the user-initiated contact function 215. The user dialog 250 comprises providing an indication 255 of the mediation condition to a user of the wireless communication device, for example as an alert via a user interface of the wireless communication device. The user dialog 250 further comprises presenting to the user a menu 260 of two or more options for communication between the wireless communication device and the recipient communication device. The method 200 further comprises, in response to the user dialog 250, initiating a communication action 270 in accordance with an option selected from the menu 260.

Local Time Information

The present invention relates to time-based mediation of wireless communications, and thus involves determining local time information of a recipient communication device to be contacted. For example the local time information may be indicative of a current local time of the recipient communication device in their current part of the world, a time zone in which the recipient communication device currently resides, a time zone difference between the sending wireless communication device and the recipient communication device, or the like, or a combination thereof. As used herein, the term "sending wireless communication device" refers to a wireless communication device from which contact with the recipient communication device is initiated. The term "sender" refers to a user of the sending wireless communication device.

In some embodiments, determining local time information comprises automatically communicating with the recipient communication device to retrieve information such as a current local time or a time zone thereof, or both.

In some embodiments, determining local time information comprises determining a time zone difference between the sending wireless communication device and the recipient communication device, for example by determining a first time zone value indicative of a time zone of the sending wireless communication device and a second time zone value indicative of a time zone of the recipient communication device, subtracting the first time zone value from the second time zone value or vice-versa. In some embodiments, a time zone associated with a device may be determined by user input, by reading a setting of the device, by receiving and interpreting a signal indicative of current time or time zone indicator from a base station, or the like.

In some embodiments, a time zone difference between two devices may be determined by subtracting current times of the two devices, for example obtained from time-of-day clocks aboard each device.

In some embodiments, determining local time information comprises determining a current local time of the recipient communication device by reading a current clock time stored in the sending wireless communication device and adding a time zone difference to the clock time.

In some embodiments, determining local time information comprises determining a time zone of the recipient communication device associated with an area code, country code, or a combination thereof, of a telephone number of the recipient communication device. For example, area codes, country codes, and time zones associated therewith may be stored in a lookup table stored in the sending wireless communication device, and a time zone of a dialed recipient device may automatically be generated by a lookup operation following dialing. Given the recipient time zone, a time zone difference may be determined by subtracting a value representing the time zone of the sending wireless communication device from a value representing the recipient time zone. Current local time of the recipient communication device may be determined by adding a time zone difference to the current local time of the sending wireless communication device. In some embodiments, a determination of whether the recipient communication device is not roaming or is incapable of roaming may be performed so as to validate the assumption that the dialed area code and country code are reliable indicators of time zone.

Determining local time information of a recipient communication device based on area code and country code may be performed without requiring automatic communication. This may facilitate operation of the present invention in situations where the recipient communication device is not configured to participate in automatic communication operations as described herein.

In some embodiments, determining local time information comprises determining roaming information indicative of current location and time zone of a roaming recipient communication device. Roaming information may be stored on one or more servers of communication service providers, such as home location registers or visitor location registers.

Mediation Condition

The present invention relates to determining a mediation condition based in part on the determined local time information associated with the recipient communication device. The mediation condition generally relates to appropriateness of different modes of communication between specified users at different times. For example, the mediation condition may be indicative of at least whether obtained local time information, such as current local time, is within an appropriate range for contacting the recipient communication device from the sending wireless communication device using one or more specified communication modes.

In some embodiments, the mediation condition is indicative of one or more ranges of appropriate times for contacting the recipient communication device from the sending wireless communication device, each of said one or more ranges associated with a different set of one or more communication modes. For example, the determined mediation condition may comprise a schedule of times when it is appropriate for both users of both sending and recipient devices to communicate using a mode such as voice, text, instant messaging, email, or the like.

In some embodiments, determining a mediation condition comprises intersecting a first range of appropriate times for initiating communication in a predetermined mode with a second range of appropriate times for receiving communication in said mode. The first range of appropriate times may be stored on the sending wireless communication device, and the second range of appropriate times may be stored on the recipient communication device. Intersecting the two ranges results in a range or schedule of mutually appropriate times for communicating in the predetermined mode. Determining the mediation condition may comprise performing such intersection operations for plural communication modes.

The mediation condition may depend on one or more other factors, such as an identified relationship between the calling party and the called party. For example, when contact is initiated between close family members, the range of appropriate times may be different than when contact is initiated between business associates, or between an employer and employee. Ranges of appropriate times for different communication modes may be customized according to identity of calling and called parties, relationships therebetween, or the like. Mediation conditions, designating appropriate time ranges for initiating or receiving communication in a specified mode, may therefore depend on a predetermined relationship between users or devices involved in the pending communication.

In some embodiments, the mediation condition may indicate degrees to which a specified communication mode is appropriate at a specified time. For example, in addition to indicating whether a communication mode and time is appropriate or inappropriate, the mediation condition may indicate that the communication mode and time is slightly appropriate or inappropriate, somewhat appropriate or inappropriate, or highly appropriate or inappropriate. Appropriateness may alternatively be designated as desirability, acceptability, preferability, or the like.

Automatic Communication Session

In some embodiments, determining local time information, determining a mediation condition, or both, is based at least in part on data exchanged during an automatic communication session, which is initiated in response to a user-initiated contact function and occurs prior to user-to-user communication. The automatic communication session may occur as machine-to-machine communication between the sending wireless communication device and the recipient communication device during an initial call set-up phase, before user-to-user communication occurs, for example.

Figure 3:
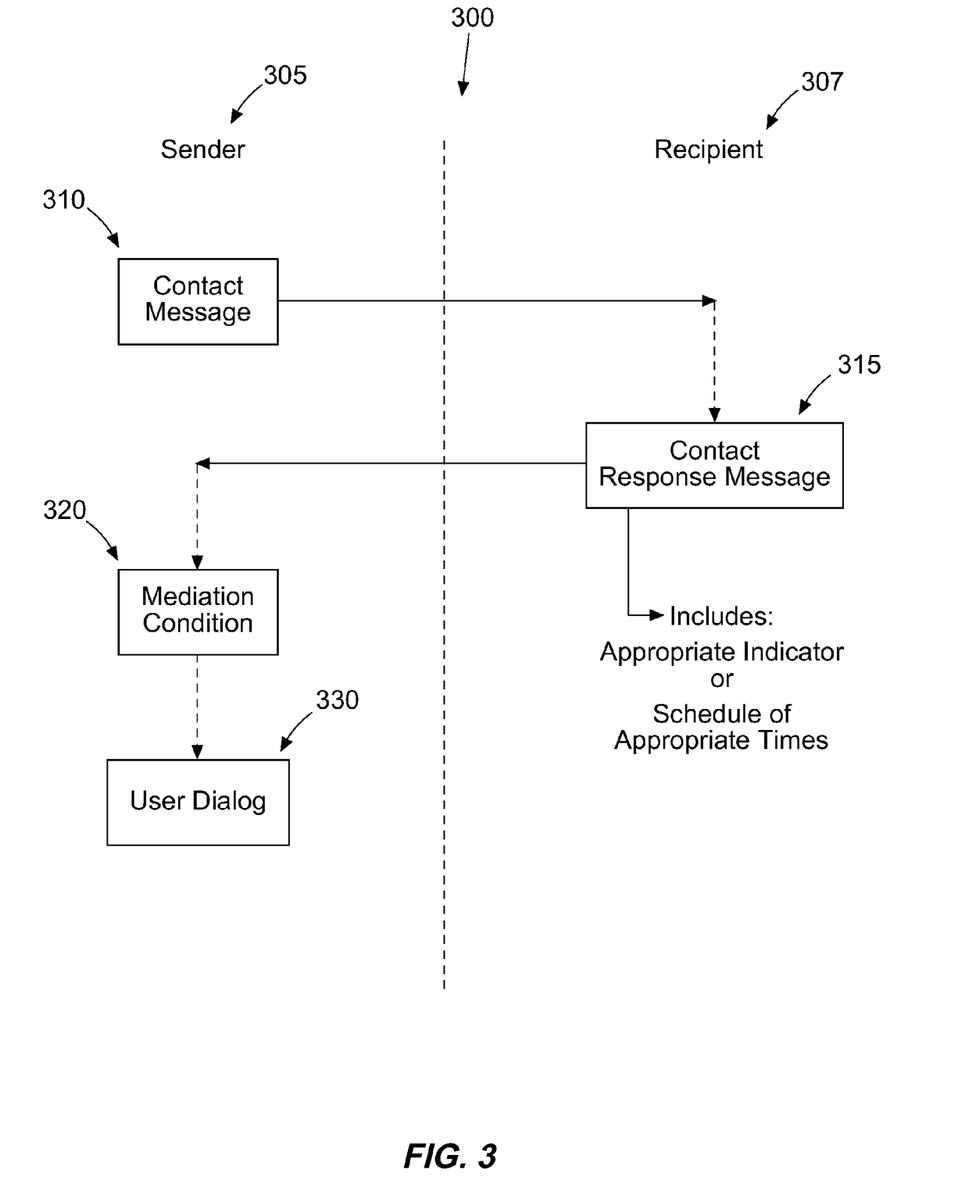
FIG. 3 illustrates an automatic communication session between a wireless communication device and a recipient communication device, in accordance with embodiments of the present invention.

For example, FIG. 3 illustrates an automatic communication session 300 for determining local time information associated with the recipient communication device and a mediation condition based in part thereon. During the session 300, the sending wireless communication device 305 sends a contact message 310 to the recipient communication device 307, the contact message 310 indicative of a desired communication mode to be used, such as voice, data, or the like. In some embodiments, if the communication is scheduled in the future, the contact message 310 may also include an indication of a proposed time of the communication.

The recipient 307 receives the contact message 310 and makes a determination of whether the desired communication mode is appropriate at the current or proposed future time. The recipient 307 then sends a contact response message 315 to the sending device 305. If communication in the desired mode is appropriate at the relevant current or proposed future time, then the contact response message 315 indicates same, and the sending device 305 may proceed with the communication. Otherwise, the contact response message may contain one or more ranges of times when communication in the desired is appropriate, possibly along with an indication of which other communication modes are currently appropriate, or ranges of times during which other communication modes are appropriate, or both.

Upon receipt of a contact response message 315, the sending device 305 may, if the contact response message 315 indicates that communication in the desired mode is not appropriate at the relevant time, compute a mediation condition 320, for example comprising a schedule of appropriate alternative times, communication modes, or a combination thereof. A user dialog 330, comprising an alert and menu may then be presented to a user of the sending device, providing options for contacting the recipient 307, for example by overriding the preferences communicated by the recipient or by scheduling or contacting the recipient in an alternative mode or at an alternative time.

In some embodiments, the present invention may be configured to substantially inhibit mediation in certain conditions, for example due to initiation of emergency 911 calls, calls to or from contacts on a predetermined "VIP" list, calls from unknown contacts, or the like. For example, a recipient device may be configured so as not to reveal its current time zone to unknown wireless communication devices, thereby inhibiting release of information which could otherwise be misused, for example to break in to the recipient's house when they are away.

User Dialog

Embodiments of the present invention comprise interfacing, when appropriate, with a user of a sending wireless communication device in a user dialog. For example, the user dialog may comprise communicating, via a user interface module, an indication of said mediation condition, and presenting, via the user interface module, a menu of two or more options for contacting the recipient communication device.

The user dialog is configured to appear if the mediation condition satisfies a predetermined criterion, such as a proposed communication mode and time being undesirable to the sending device, the recipient device, or both. The user dialog may comprise an alert, such as a visual, text or audio alert. For example, the alert may indicate: "The current local time of the party you are trying to contact is 3 am. Do you want to continue with this call?" The user may then be able to choose an option to continue the call regardless of the mediation condition, thereby overriding mediation, or to choose an alternative contact method.

The user dialog may comprise an interactive menu for selecting an alternative communication mode, scheduling an alternative time for communication, or a combination thereof. For example, if the user selects an option to choose an alternative contact method, an interactive menu for selecting an alternative communication mode and optionally scheduling an alternative time may be presented via a display screen, and responsive to user input from an input interface such as keypad, touchscreen, voice command input, or the like.

Figure 4:
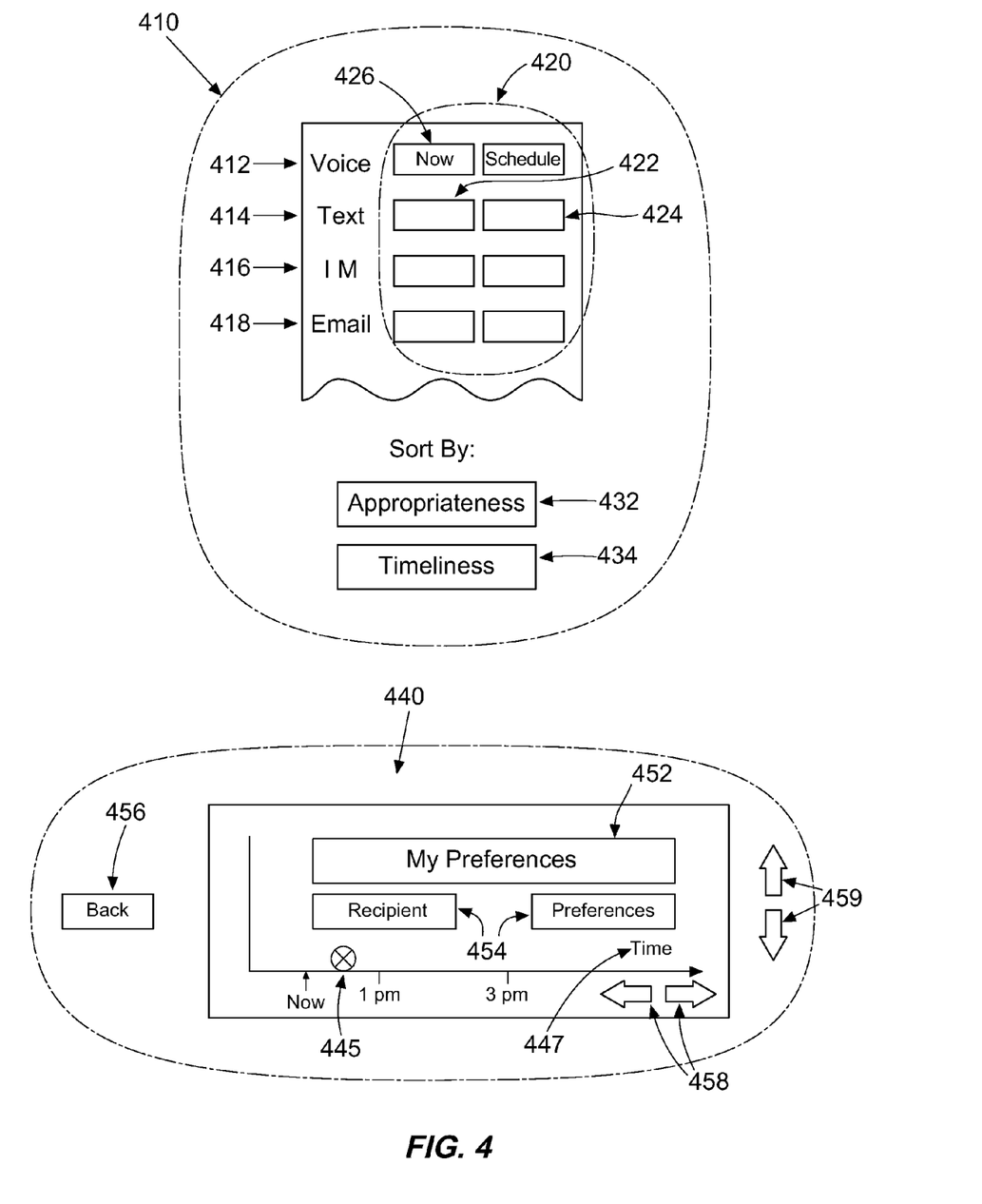
FIG. 4 illustrates a menu of options for contacting a recipient communication device, in accordance with embodiments of the present invention.

FIG. 4 illustrates a menu, presented via a user interface, for user selection of an alternative communication mode, scheduled communication time, or both. A main menu 410 is presented, listing options for selecting a potential communication mode such as a voice call 412, text messaging 414, instant messaging 416, and email 418. The menu includes virtual buttons 420 which can be navigated by the user, for example via a touchscreen, keypad or the like, to select a desired option. As illustrated, for each potential communication mode, a first virtual button is provided for immediately initiating a selected communication mode, for example button 422 for text messaging. A second virtual button is also provided which leads to a scheduling sub-menu 440, where the user can interactively schedule a future time for initiating the selected communication mode, for example button 424 for text messaging. In some embodiments, buttons may be grayed out if they are not available. For example, button 426 for immediately establishing a voice call may be grayed out if it is not appropriate to establish a voice call at the current time.

A virtual button 432 may also be provided for sorting the menu items from most appropriate to least appropriate in accordance with a predetermined criterion. A virtual button 434 may also be provided for sorting the menu items, placing sooner available communication modes higher up the list of options.

FIG. 4 further illustrates a scheduling sub-menu 440. The sub-menu graphically illustrates time ranges during which it is appropriate to use a selected communication mode, in accordance with information contained in the determined mediation condition, for example. A cursor 445 is movable along a timeline 447 to a point representative of a desired scheduled time for contacting the recipient communication device in the selected communication mode. A first bar 452, parallel to the timeline 447, illustrates ranges of times during which use of the selected communication mode is appropriate according to preferences of the sending wireless communication device. A second bar 454, parallel to the timeline 447, illustrates ranges of times during which use of the selected communication mode is appropriate according to preferences of the recipient communication device. The first bar 452 and the second bar 454 may be determined by the mediation condition. In some embodiments, the cursor may be restricted to regions of the timeline 447 spanned by one or both of the first bar 452 and the second bar 454. Such restriction may be turned on or off by pressing a virtual button or other means. In some embodiments, other virtual buttons may be provided, for example to go back to a previous menu 456, to scroll to future time ranges 458, or to switch between selected modes 459, or the like.

To aid the user in determining an appropriate communication mode, time, or both, the menu may graphically display an indication of useful information, such as information conveyed in the mediation condition. For example, the menu may comprise a graphical representation of appropriate contact time ranges for each of a plurality of communication modes.

Figure 5:
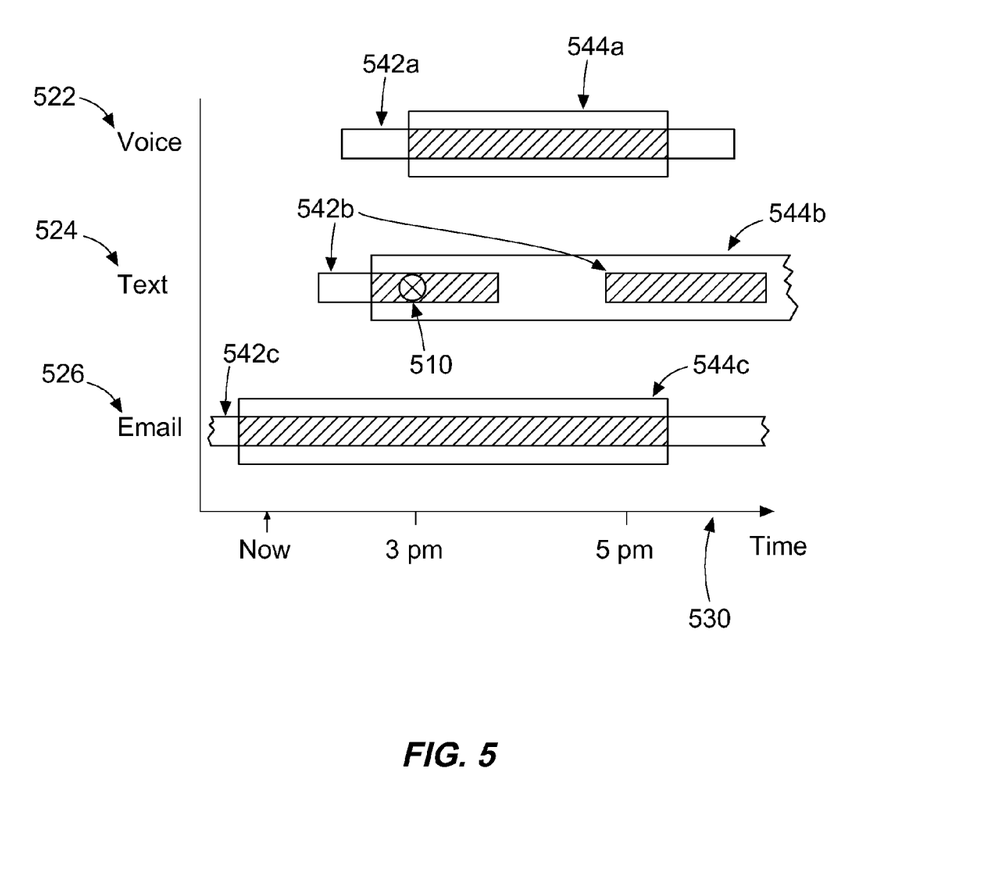
FIG. 5 illustrates another menu of options for contacting a recipient communication device, in accordance with embodiments of the present invention.

FIG. 5 illustrates a menu comprising a graphical representation of appropriate contact time ranges for each of a plurality of communication modes. A cursor 510 is presented on a screen and movable by user input both vertically and horizontally. The vertical position of the cursor 510 corresponds to a desired communication mode, such as voice 522, text 524 or email 526. The horizontal position of the cursor 510 corresponds to a desired time for performing or scheduling the communication, relative to a timeline 530. For each communication mode, a pair of bars is displayed, indicating appropriate time ranges for contacting the recipient in a corresponding communication mode. As illustrated, the narrow bars 542a, 542b and 542c represent appropriate times specified by the recipient communication device, and the wide bars 544a, 544b and 544c represent appropriate times specified by the sending communication device. These appropriate times may correspond to times indicated by the mediation condition. The shaded intersections of the narrow bars and the wide bars represent times which are mutually appropriate to both sender and recipient. User controls for rescaling the menu, scrolling horizontally or vertically, restricting or unrestricting the cursor to appropriate times, or the like, may also be provided.

Embodiments of the present invention may include processing operations to aid the user in determining an appropriate communication mode, time, or both. For example, processing operations may be configured to display menu items in order from most desirable to least desirable, for example based on previous user choices, preferences set in the sending wireless communication device, preferences set in the recipient communication device, time of day, relationship between sender and recipient users, or the like.

A communication operation is initiated based on outcome of the user dialog, for example in accordance with an option selected from the menu. For example, communication in a selected communication mode may be initiated immediately, or if the user has selected an option to schedule the communication at a selected future time, a contact function for initiating contact with the recipient communication device in a selected mode may be scheduled to occur at the selected future time. Scheduling of a contact function may be performed by storing a trigger in memory, which automatically initiates the scheduled contact function when an internal clock of the sending wireless communication device reaches the scheduled time. Scheduling of a contact function may be performed by storing a callback reminder in memory, which automatically prompts the user to initiate the selected contact function when an internal clock of the sending wireless communication device reaches the scheduled time.

Computer Program Product

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communications device.

Acts associated with the method described herein can be implemented as coded instructions in plural computer program products. For example, a first portion of the method may be performed using one mobile electronic device, and a second portion of the method may be performed using another mobile electronic device. In this case, each computer program product is a computer-readable medium upon which software code is recorded to execute appropriate portions of the method when a computer program product is loaded into memory and executed on the microprocessor of a wireless communications device.

Wireless Communication Device

The method described herein can be implemented on a wireless communication device having appropriate communication capabilities, such as voice communication capabilities, data communication capabilities, or a combination thereof. The term "wireless communication device," for the purposes of this specification, shall include any wireless handheld, smart phone, PDA, tablet, laptop, netbook, or other communication device that is capable of transmission and reception of data via a wireless communication medium such as radio.

Figure 6:
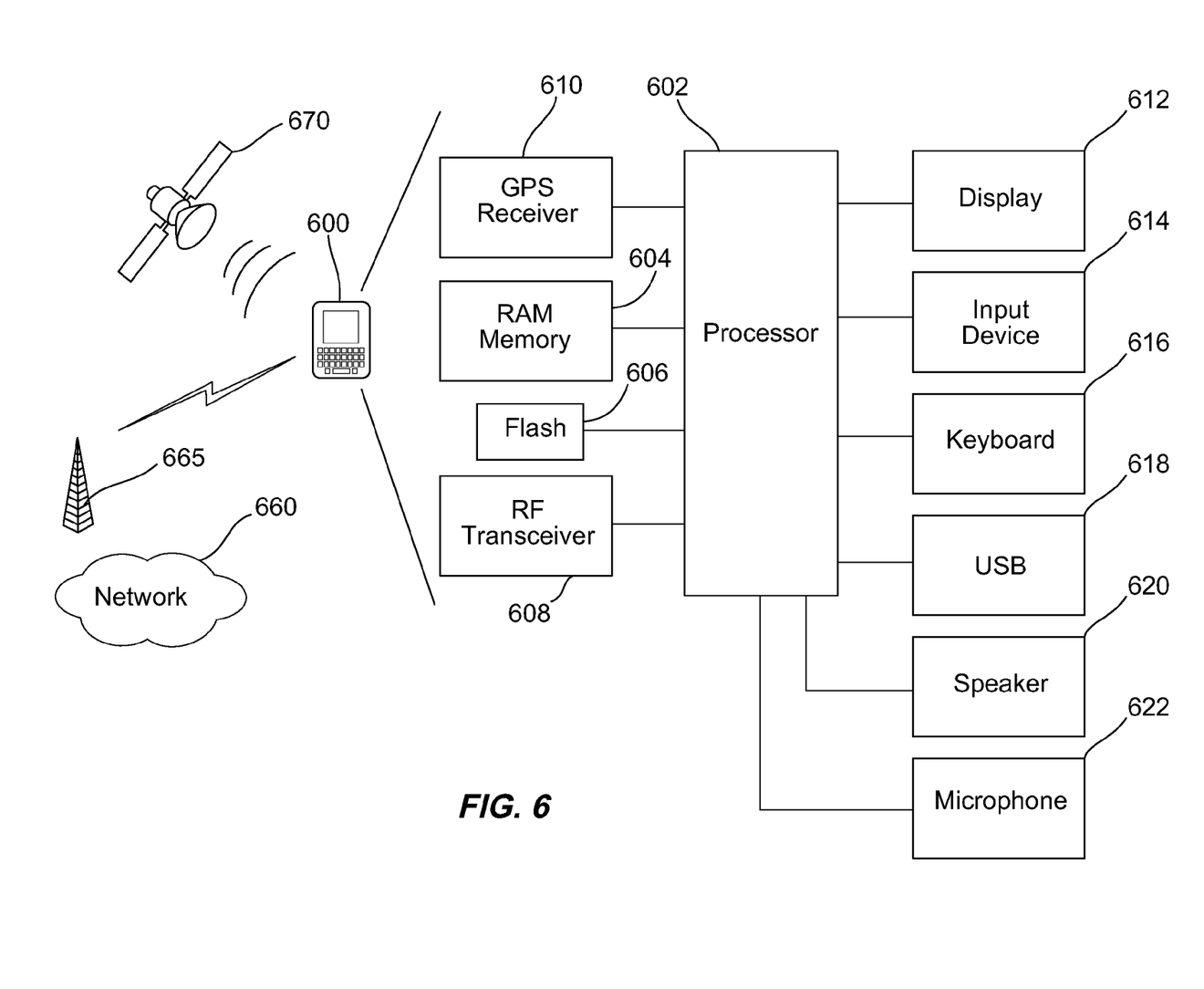
FIG. 6 illustrates a block diagram of an exemplary wireless communications device.

FIG. 6 is a block diagram depicting certain main components of an exemplary wireless communications device 600. It should be understood that this figure is intentionally simplified to show only certain components; the device 600 may include other components beyond those shown in FIG. 2. The device 600 includes a microprocessor 602 (or simply a "processor") which interacts with memory in the form of RAM 604 and flash memory 606 to enable a variety of device functions and to execute an operating system for running software applications loaded on the device, including functions of the mediation module. The device 600 includes a radiofrequency (RF) transceiver 608 for communicating wirelessly with a base station 665 of a wireless network 660, or alternatively or additionally for communicating directly with another peer device such as a wireless communication device, for example as may occur in some ad-hoc networks. The base station 665 may be a cellular base station, wireless access point, or the like. The base station 665 may change as the wireless device travels. The RF transceiver includes a wireless communication channel for transmitting and receiving data. The RF transceiver may further include a wireless voice channel for transmitting and receiving voice communications, for example concurrently with transmission and reception of data over the same or a separate logical or physical channel.

The device 600 optionally includes a GPS receiver chipset 610 for receiving GPS radio signals transmitted from one or more orbiting GPS satellites 670. The GPS receiver chipset 610 can be embedded within the device or externally connected, such as, for example, a "Bluetooth" GPS puck or dongle. Other positioning systems may also be used in place of GPS, as would be readily understood by a worker skilled in the art.

In terms of input/output devices or user interfaces (UI's), the device 600 typically includes a display 612 (e.g. a small LCD screen), a thumbwheel and/or trackball 614, a keyboard 616, a USB 618 or serial port for connecting to peripheral equipment, a speaker 620 and a microphone 622. The device's display 612 may optionally include a touchscreen input device. A user interface module may comprise one or more user interfaces along with appropriate processing capabilities using a microprocessor, or the like, the user interface module configured in a predetermined manner.

The wireless communication device 600 sends and receives communication signals via the RF transceiver 608. A wireless communication module, including the RF transceiver 608 and components or portions thereof operatively coupled to the RF transceiver 608, is provided for contacting and communicating with other devices via a wireless network. When communicating wirelessly with a base station 665 of a wireless network 660, the device 600 may communicate in accordance with one or more appropriate technologies such as: Global Systems for Mobile communications (GSM), General Packet Radio Service (GPRS), Code Division Multiple Access (CDMA) technologies, Wideband CDMA (WCDMA), whether 2G, 3G, High speed packet access (HSPA), Universal Mobile Telecommunication System (UMTS) based technologies, Long Term Evolution (LTE) technologies, Orthogonal Frequency Division Multiplexing (OFDM) technologies, Ultra-Wideband (UWB) technologies, WiFi or WiMAX technologies, or other communication technologies and protocols as would readily be understood by a worker skilled in the art. In some embodiments, the wireless device 600 may be capable of operation using multiple protocols. The base station 665 may be part of a wireless network, such as a cellular network, local-area network, wide-area network, wireless hotspot network, or the like. The wireless device, base station, network components, and the like, may be configured for data communication, voice communication, or a combination thereof, possibly using additional components, configurations and procedures where appropriate, such as SIM cards, authorization and authentication procedures, handoff procedures, and the like, as would be readily understood by a worker skilled in the art.

Although in some implementations of the present technology GPS receivers are used to determine the current location of each device, it should be appreciated that other techniques can be used to determine the current location to a degree of accuracy commensurate with the technique used. For example, cell tower triangulation or radiolocation techniques, as mentioned above, can be used to generate the current location for the device. Alternatively, the identity (and location) of the cell tower handling the device's communications can be used as a proxy for the location of the device. Another approach would be to prompt the user of the device to enter his or her current location, for example by entering a street address, picking a POI from a map, or selecting the current location using crosshairs on a map. As yet another example, Global Navigation Satellite Systems (GNSS) or pseudo-satellite systems other than or in addition to the currently deployed GPS system may be used. For example, GLONASS, Beidou, COMPASS, Galileo, or like systems may be utilized for positioning. Satellite-based, regional, or network-based augmentation or improvement systems such as WAAS and A-GPS may also be utilized to aid in positioning.

This new technology has been described in terms of specific implementations and configurations (and variants thereof) which are intended to be exemplary only. The scope of the exclusive right sought by the applicant is therefore intended to be limited solely by the appended claims.

The invention claimed is:

1. A wireless communication device comprising:
 a) a user interface module configured to initiate a contact function in response to user input, the contact function for initiating contact with a recipient communication device; and
 b) a mediation module operatively coupled to the user interface module, the mediation module configured to:
  i) determine, in response to the contact function, local time information associated with the recipient communication device;
  ii) determine a mediation condition based in part on said local time information; and
  iii) if the mediation condition satisfies a predetermined criterion, provide, via the user interface module, an indication of said mediation condition; present, via the user interface module, a menu of two or more options for contacting the recipient communication device; and initiate communication in accordance with an option selected from said menu,
 wherein the mediation module is configured to initiate, using the wireless communication module, an automatic communication session with the recipient communication device, wherein determining at least one of said local time information and said mediation condition is based at least in part on data exchanged during the automatic communication session, wherein the automatic communication session is initiated in response to the contact function and occurs during an initial call set-up phase prior to user-to-user communication.

2. The wireless communication device according to claim 1, further comprising a wireless communication module operatively coupled to the mediation module and configured to perform communication in accordance with the selected option, the wireless communication module configured to support at least one voice-based communication mode and at least one data-based communication mode.

3. The wireless communication device according to claim 1, wherein the two or more options include an option for contacting the recipient communication device using a voice-based communication mode and an option for contacting the recipient communication device using a data-based communication mode.

4. The wireless communication device according to claim 1, wherein the two or more options include an option for scheduling contact with the recipient communication device at a future time.

5. The wireless communication device according to claim 1, wherein the local time information is selected from the group consisting of: a time zone difference between the wireless communication device and the recipient communication device, and a current local time of the recipient communication device.

6. The wireless communication device according to claim 1, wherein the mediation condition is indicative of whether said local time information is within an appropriate range for contacting the recipient communication device using one or more communication modes.

7. The wireless communication device according to claim 6, wherein the mediation condition is further indicative of a first range of appropriate times for contacting the recipient communication device in a first communication mode, and a second range of appropriate times for contacting the recipient communication device in a second communication mode.

8. A method for facilitating communication between a wireless communication device and a recipient communication device, the method comprising:
   a) initiating an automatic communication session between the wireless communication device and the recipient communication device; and
   b) determining local time information associated with the recipient communication device in response to a user-initiated contact function;
   c) determining a mediation condition based at least in part on said local time information, wherein at least one of said local time information and said mediation condition is determined based at least in part on data exchanged during the automatic communication session; and
   d) if the mediation condition satisfies a predetermined criterion:
      i) providing, to a user of the wireless communication device, an indication of said mediation condition;
      ii) presenting, to said user, a menu of two or more options for contacting the recipient communication device using the wireless communication device; and
      iii) initiating communication in accordance with an option selected from said menu;
   wherein the automatic communication session is initiated in response to the user-initiated contact function and occurs during an initial call set-up phase prior to user-to-user communication.

9. The method according to claim 8, wherein the two or more options include an option for contacting the recipient communication device using a voice-based communication mode and an option for contacting the recipient communication device using a data-based communication mode.

10. The method according to claim 8, wherein the two or more options include an option for scheduling contact with the recipient communication device at a future time.

11. The method according to claim 8, wherein the local time information is selected from the group consisting of: a time zone difference between the wireless communication device and the recipient communication device, and a current local time of the recipient communication device.

12. The method according to claim 8, wherein the mediation condition is indicative of whether said local time information is within an appropriate range for contacting the recipient communication device using one or more communication modes.

13. The method according to claim 12, wherein the mediation condition is further indicative a first range of appropriate times for contacting the recipient communication device in a first communication mode, and a second range of appropriate times for contacting the recipient communication device in a second communication mode.

14. A computer program product comprising code which, when loaded into memory and executed on a processor of a wireless communications device, is adapted to:
   a) initiate an automatic communication session between the wireless communication device and the recipient communication device; and
   b) determine local time information associated with the recipient communication device in response to a user-initiated contact function;
   c) determine a mediation condition based at least in part on said local time information, wherein at least one of said local time information and said mediation condition is determined based at least in part on data exchanged during the automatic communication session; and
   d) if the mediation condition satisfies a predetermined criterion:
      i) provide, to a user of the wireless communication device, an indication of said mediation condition;
      ii) present, to said user, a menu of two or more options for contacting the recipient communication device using the wireless communication device; and
      iii) initiate communication in accordance with an option selected from said menu;
   wherein the automatic communication session is initiated in response to the user-initiated contact function and occurs during initial call set-up phase prior to user-to-user communication.

15. The computer program product according to claim 14, wherein the two or more options include an option for contacting the recipient communication device using a voice-based communication mode and an option for contacting the recipient communication device using a data-based communication mode.

16. The computer program product according to claim 14, wherein the two or more options include an option for scheduling contact with the recipient communication device at a future time.

17. The computer program product according to claim 14, wherein the local time information is selected from the group consisting of: a time zone difference between the wireless communication device and the recipient communication device, and a current local time of the recipient communication device.

18. The computer program product according to claim 14, wherein the mediation condition is indicative of whether said local time information is within an appropriate range for contacting the recipient communication device using one or more communication modes.

19. The computer program product according to claim 18, wherein the mediation condition is further indicative of a first range of appropriate times for contacting the recipient communication device in a first communication mode, and a second range of appropriate times for contacting the recipient communication device in a second communication mode.

20. The wireless communication device according to claim 1, wherein determining said mediation condition is further based on an identified relationship between a user of the wireless communication device and a user of the recipient communication device.

21. The method according to claim 8, wherein determining said mediation condition is further based on an identified relationship between a user of the wireless communication device and a user of the recipient communication device.

22. The wireless communication device according to claim 1, wherein the determined mediation condition comprises a schedule of appropriate times for contacting the recipient communication device using one or more specified communication modes.

23. The wireless communication device according to claim 1, wherein the automatic communication session comprises sending a contact message from the wireless communication device to the recipient communication device, the contact message indicative of a desired communication mode to be used and optionally further indicative of a proposed time for communicating using said desired communication mode.

24. The wireless communication device according to claim 23, wherein the automatic communication session further comprises sending a contact response message from the recipient communication device to the wireless communication device in response to the contact message, the contact response message indicative of whether communication in the desired communication mode at the proposed time is appropriate.

25. The wireless communication device according to claim 24, wherein, when said communication in the desired communication mode at the proposed time is inappropriate, the contact response message is indicative of one or more ranges of times when communication in one or more modes is appropriate.

26. The wireless communication device according to claim 1, wherein determining the mediation condition comprises automatically determining a schedule of times which are mutually appropriate to the wireless communication device and the recipient communication device for communicating in one or more specified communication modes.

* * * * *